United States Patent [19]

Calevich et al.

[11] Patent Number: 4,621,773
[45] Date of Patent: Nov. 11, 1986

[54] OPERATION AND CONTROL SYSTEM FOR COMMINUTION EQUIPMENT

[75] Inventors: Robert Calevich, Richmond Heights; George V. Chinchar, Mentor, both of Ohio

[73] Assignee: The Goodyear Tire & Rubber Company, Akron, Ohio

[21] Appl. No.: 673,909

[22] Filed: Nov. 21, 1984

[51] Int. Cl.$^4$ ............................................. B02C 25/00
[52] U.S. Cl. ...................................... 241/21; 241/34; 241/37
[58] Field of Search .................. 241/35, 34, 36, 37, 241/DIG. 30, 21, 30, 259.1, 259.2, 259.3

[56] References Cited

U.S. PATENT DOCUMENTS

| | | | |
|---|---|---|---|
| 2,211,518 | 8/1940 | Scherbaum | 83/7 |
| 2,833,483 | 5/1958 | China | 241/37 |
| 2,876,958 | 3/1959 | Edwards et al. | 241/259.2 |
| 2,909,332 | 10/1959 | Brown et al. | 241/46 |
| 3,309,031 | 3/1967 | McMahon et al. | 241/37 |
| 3,610,541 | 10/1971 | Gudaz | 241/37 |
| 3,654,075 | 4/1972 | Keyes et al. | 241/37 X |
| 3,810,584 | 5/1974 | Kahmann | 241/37 |
| 3,847,359 | 11/1974 | Holmes et al. | 241/34 |
| 3,961,757 | 6/1976 | Berggren | 241/28 |
| 4,383,650 | 5/1983 | Contal et al. | 241/66 |
| 4,449,670 | 5/1984 | Tloczynski et al. | 241/35 |
| 4,469,284 | 9/1984 | Brubaker et al. | 241/DIG. 31 |

FOREIGN PATENT DOCUMENTS 2316389 4/1973 Fed. Rep. of Germany.

Primary Examiner—Mark Rosenbaum
Attorney, Agent, or Firm—Fay & Sharp

[57] ABSTRACT

A slurry feeding assembly (A) feeds a mixture of water and rubber pellets to a comminuting region defined between a rotor (74) and a stator (66). As an electric rotor motor (70) rotates the rotor relative to the stator, a power monitor (114) monitors of a control circuit (D) the amount of electrical power drawn thereby. The control circuit controls a pressure regulator (C) to increase and decrease the pressure between the rotor and stator in such a manner that the power drawn by the electric rotor motor remains substantially constant. The control circuit further initiates operation of various components of the comminuting apparatus in a preselected order. Specifically, the control circuit first starts the feed of water or other fluid to the rotor and stator. Thereafter, the electric rotor motor is started, followed by enabling of the pressure regulator assembly. Finally, a pellet feeding assembly (10) is initiated such that a progressively increasing concentration of pellets is introduced into the slurry until steady state operating conditions are attained. Under steady state conditions, the pellet feed rate is selectively varied to adjust the concentration of pellets in the slurry in such a manner that the power drawn by the rotor motor remains generally constant.

12 Claims, 3 Drawing Figures

OPERATION AND CONTROL SYSTEM FOR COMMINUTION EQUIPMENT

BACKGROUND OF THE INVENTION

The present invention relates to the art of electrical control systems, particularly control system for comminuting apparatus. The present invention finds particular application in reprocessing vulcanized rubber by comminuting rubber pellets to micron-sized particles and will be described with particular reference thereto. It is to be appreciated, however, that the invention finds application in the comminution or size reduction of other solid materials such as synthetic and natural elastomers, plastics, coal, and the like.

Heretofore, comminuting apparatus have commonly included a pair of comminuting stones, one stationarily mounted and the other rotatably mounted, between which particles were comminuted to smaller sizes. A slurry of particles or pellets and water were pumped between the rotor and stator to be comminuted therebetween. Fluid cylinders were provided for urging the rotor and stator together with a preselected pressure or force.

In one prior art apparatus, an operator was relied upon to control and adjust the operating parameters. Human control has several drawbacks relative to automated controllers including a relatively slow response time, relatively high hourly cost, judgemental errors, and the like.

The present invention provides an automatic control system for comminuting apparatus and the like which overcomes the above-referenced problems and others.

SUMMARY OF THE INVENTION

In accordance with the present invention, a comminuting apparatus includes a rotor and stator for comminuting pellets therebetween, a motor for causing relative rotational movement between the stator and rotor, and a pressure regulator assembly for controlling the pressure or force with which the rotor and stator are urged together. A slurry supply assembly provides a slurry of pellets to be comminuted intermixed with a fluid. A power monitor monitors the amount of power expended by the motor while causing relative rotation between the stator and rotor. A force adjusting means is operatively connected with the power monitoring means for selectively adjusting the force with which the pressure regulator assembly urges the rotor and stator together in such a manner that the expended motor power is retained in a preselected range. In this manner, the pressure between the rotor and stator is selectively adjusted to maintain the power drawn by the motor substantially constant.

In accordance with another aspect of the present invention, the control system undertakes a series of logic calculations to optimize the efficiency with which the comminuting apparatus is brought up to full operating capacity. The controller controls the concentration of pellets within the slurry and the pressure between the rotor and stator in a coordinated manner. Specifically, the controller starts a generally pellet-free slurry flowing to the rotor and stator which are rotated with relatively little pressure therebetween. The pressure between the rotor and stator is increased and the concentration of pellets in the slurry is increased until full operating conditions are achieved.

A primary advantage of the present invention is that it maximizes the overall efficiency of comminuting apparatus.

Another advantage of the present invention is that it protects against system failure attributable to operator error or lack of attention to varying operating conditions.

Another advantage of the present invention is that it increases comminution rates.

Still further advantages of the present invention will become apparent to those of ordinary skill in the art upon reading and understanding the following detailed description of the preferred embodiment.

BRIEF DESCRIPTION OF THE DRAWINGS

The invention may take form in various parts and arrangements of parts or various steps and arrangements of steps. The drawings are only for purposes of illustrating a preferred embodiment of the invention and are not to be construed as to limiting it. Wherein, the figures show.

DETAILED DESCRIPTION OF THE PREFERRED EMBODIMENT

Figure 1:
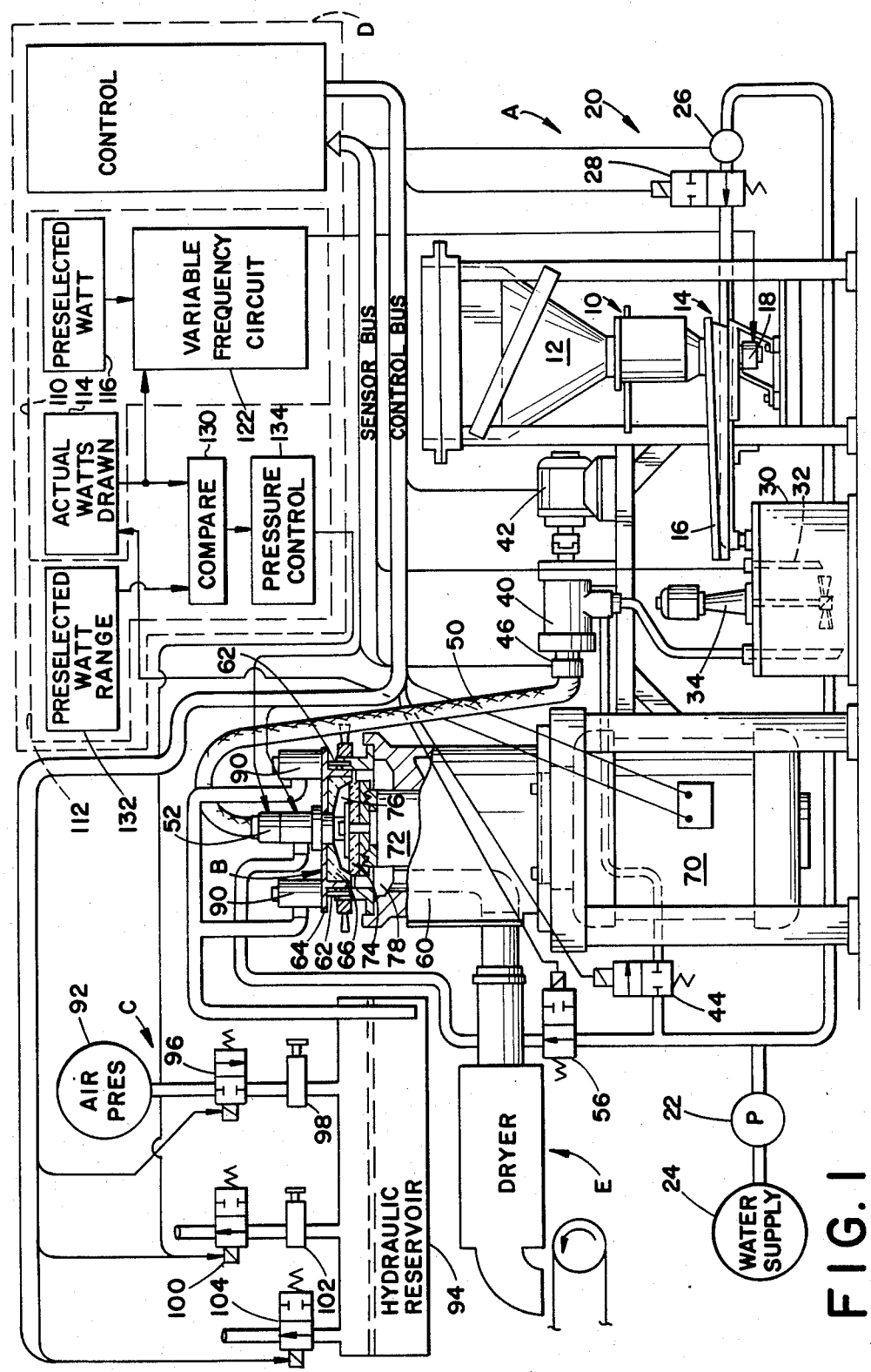
FIG. 1 is an elevational view in partial section which diagrammatically illustrates a comminuting apparatus in accordance with the present invention; and, FIGS. 2A and B are a wiring diagram of a preferred embodiment of the control system of FIG. 1.

With reference to FIG. 1, a slurry feeding means A feeds a slurry of fluid and pellets of vulcanized rubber or other materials to be comminuted to a mill B. In the mill, the slurry is passed through a grinding zone in which a combination of pressure and relative movement divides the pellets into micron-sized particles in a single pass. A pressure regulating means or assembly C selectively adjusts the pressure in the grinding region. An electrical control system or means D selectively monitors operating conditions at various points in the feed means A and the mill B in order to control the operating parameters of the various components of the comminuting apparatus herein described below. Briefly stated, the control means D controls the start-up of the mill to bring the mill to its steady state comminuting condition quickly and efficiently. Further, the control means controls the steady state operating conditions to maintain high efficiency. In particular, the control means controls the concentration of pellets in the slurry supplied by the slurry feed means A and controls the pressure regulating means C to vary the pressure in the grinding zone, both in such a manner that a substantially constant amount of energy or power is drawn by the mill B to comminute the pellets. A dryer E separates the comminuted particles from the fluid to produce a dry, particulate product.

The slurry feeding means A includes a pellet feeding means 10 for supplying pellets of vulcanized rubber, plastics, synthetic rubber, other elastomers, coal, or the like at a selectable rate. The pellet feeding means includes a pellet hopper 12 which discharges the pellets into a vibratory feeder 14. The vibratory feeder includes a generally horizontal trough 16 which is vibrated by a motor 18. The vibratory feeder 14 feeds the pellets at a rate determined by the vibrational frequency or duty cycle of the motor 18 as controlled by the control means D.

A fluid or liquid feeding means 20 supplies fluid such as water, to be combined with the pellets to form the slurry. A pump 22 supplies liquid from a liquid supply 24 to a fluid pressure or presence sensing switch 26. A liquid or water supply solenoid valve 28 selectively supplies liquid to a liquid and pellet mixing region, such as a slurry reservoir 30. The pressure sensing switch 26 senses whether the liquid supply valve 28 is supplying liquid to the system. A liquid level control probe or sensor 32 senses the level of water in the slurry reservoir. The control means D monitors the liquid level sensor and controls operation of the liquid supply valve 28 such that the fluid level in the slurry reservoir is held substantially constant.

In the preferred embodiment, the pellets and fluid are mixed to form the slurry and the slurry is supplied to the mill. Optionally, the fluid and pellets could each be supplied to the mill separately in a coordinated manner such that the slurry is formed in the mill itself. An agitator 34 mixes the pellets and the liquid in the slurry supply reservoir 30 to maintain the pellets suspended in the liquid, hence maintain uniformity of the slurry.

The slurry is pumped by a positive displacement pump 40 from the slurry reservoir 30 to the mill B. A slurry feed motor 42 selectively controls the spped, hence the feed rate of the positive displacement pump 40. A pump priming solenoid 44 is selectively actuated by the control means D to prime the slurry pump 40. A slurry pump back pressure sensing switch 46 senses the pressure of the slurry at the output of the slurry pump and provides an indication of the presence thereof to the control system D.

A slurry feed line 50 is of appropriate diameter relative to the slurry fed rate such that the slurry is fed at a velocity which maintains the pellets suspended in the liquid. At the inlet of the mill B, a flow monitoring means 52 senses the flow rate of the slurry therethrough into the mill and the grinding zone. In the preferred embodiment, the flow monitoring means is an ultrasonic sensor which senses the passage of pellets therepast. A supplemental or emergency water feed valve 56 is selectively activated by the control system D to provide water to the grinding zone.

The mill B includes a mill housing 60 upon which a plurality of upward extending posts 62 are mounted. A stator mounting bracket 64 in which a stator 66 is mounted is slidably disposed on the posts 62 for longitudinal, but not rotational, movement relative thereto.

A mill or rotor motor 70, such as a 100 hp motor is mounted in the mill housing 60. The rotor motor is connected through a thrust bearing 72 with a rotor 74. A central portion of the rotor and the stator define a fluid receiving region for receiving the pellet and fluid slurry. An impeller 76 is connected with the rotor and disposed in the receiving region to urge the pellets into the grinding zone. The comminuted particles and fluid which pass from the grinding zone defined between selectively mating, peripheral portions of the rotor and stator are collected in a trough 78 and conveyed to the dryer E.

The pressure regulator assembly C includes a plurality of fluid actuated means, preferably hydraulic cylinders 90, for selectively controlling the force or pressure with which the rotor and stator. When comminuting vulganized rubber between a ten inch rotor and stator are pressed or urged together into intimate physical contact, a load of 2,000–10,000 lbs. has been found to produce satisfactory results, with about 3700–4000 lbs. being preferred.

A source of pressurized air or other gas 92, such as a compressor, selectively pressurizes a source of actuation fluid, such as a hydraulic fluid reservoir 94. An actuation fluid pressurizing means, such as a control valve 96 under the control of the control means D selectively passes and blocks the passage of the pressurized gas to the hydraulic fluid reservoir. A pressure increase limiting means or needle valve 98 slows the rate at which gas passes to the hydraulic reservoir. In this manner, the pressure increase limiting needle valve smoothly brings the hydraulic reservoir up to pressure at a controlled rate.

An actuation or hydraulic fluid pressure control means includes a fluid pressure decrease solenoid or bleed valve 100 which selectively vents the pressure from the hydraulic reservoir. A pressure reduction limiting means or restrictor valve 102 limits the rate of pressure reduction. An emergency pressure relief solenoid 104 selectively depressurizes the hydraulic fluid reservoir quickly.

In operation, the control means D opens the pressure reduction bleed valve 100 when the electric power drawn by the motor 70 reaches the top of the preselected power drawn range and closes the pressure reduction solenoid when the power drawn is safely below the top of the preselected power drawn range. The pressure increase limiting means 98 and the pressure decrease limiting means 102 limit the rate of hydraulic fluid pressure change. In this manner, varying the duty cycle of the pressure reduction bleed valve 100 selects and maintains any one of a continuum of hydraulic fluid pressures.

The control circuit D includes a slurry start-up control circuit 110 for bringing the apparatus from a stopped condition up to full operating conditions and a steady state control circuit 112 for controlling operating parameters once the apparatus is brought up to full operating conditions. The slurry start-up circuit 110 includes an electric power monitoring means or circuit 114 for monitoring the actual electrical power or watts drawn by the mill or rotor motor 70. A preselected start-up set point or memory means 116 provides an indication of a preselected start-up set point or nominal amount of electrical power to be drawn by the rotor motor.

A pellet supply rate control means causes the pellet feed means to supply pellets to the grinding zone at a rate that is inversely proportional to the difference between the actual and set point electrical power. A variable frequency means, such as a voltage to frequency converter 122, provides a vibratory pellet supply signal whose frequency approaches a steady state or limit frequency. That the concentration of pellets in the slurry increases as the actual power drawn by the rotor motor approaches the start-up set point. The pellet supply signal is conveyed to the vibratory trough motor 18. The pellet feed trough 16 conveys pellets to the slurry tank at a rate proportional to the frequency of trough vibration.

The steady state control circuit 112 includes a pressure adjusting means for causing adjustment of the force with which the pressure regulator assembly C urges the rotor and stator together in such a manner that the actual electric power drawn by the mill motor 70 is maintained generally constant. Specifically, a comparing means 130 compares the actual power drawn with a preselected pressure control power set point or memory means 132. A pressure control circuit 134 controls the duty cycle of the pressure control bleed valve 100. Specifically, when the actual power drawn by the rotor motor exceeds the preselected pressure control set point, the pressure control circuit 134 causes the pressure control bleed valve 100 to open; when the actual power drawn drops below the preselected pressure control power set point, the pressure control circuit 134 causes the pressure control bleed valve 100 to close. In this manner, the duty cycle of the pressure control bleed valve 100 is selectively adjusted to maintain the power consumption of the rotor motor substantially constant.

Figure 2A:
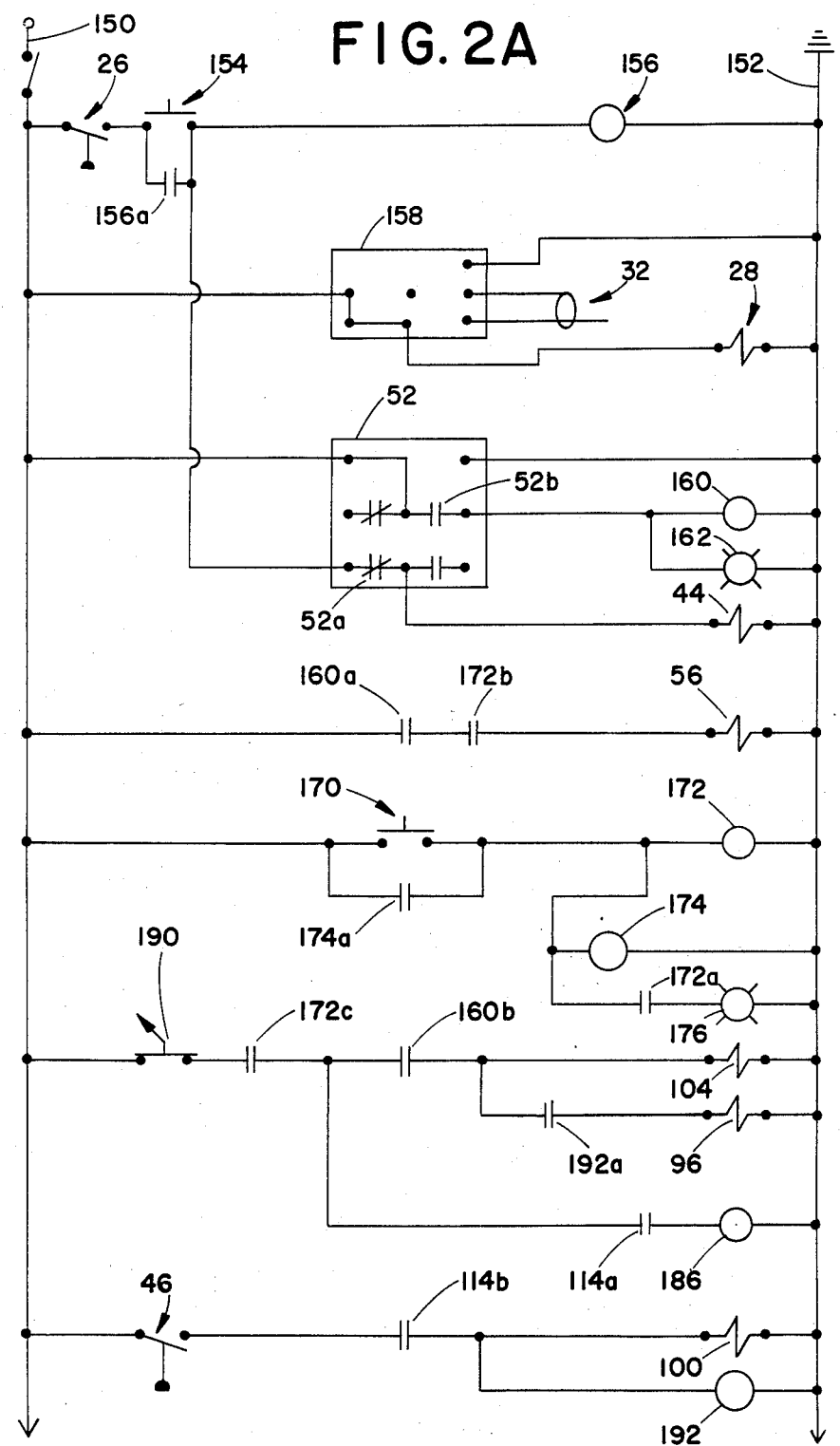
Figure 2B:
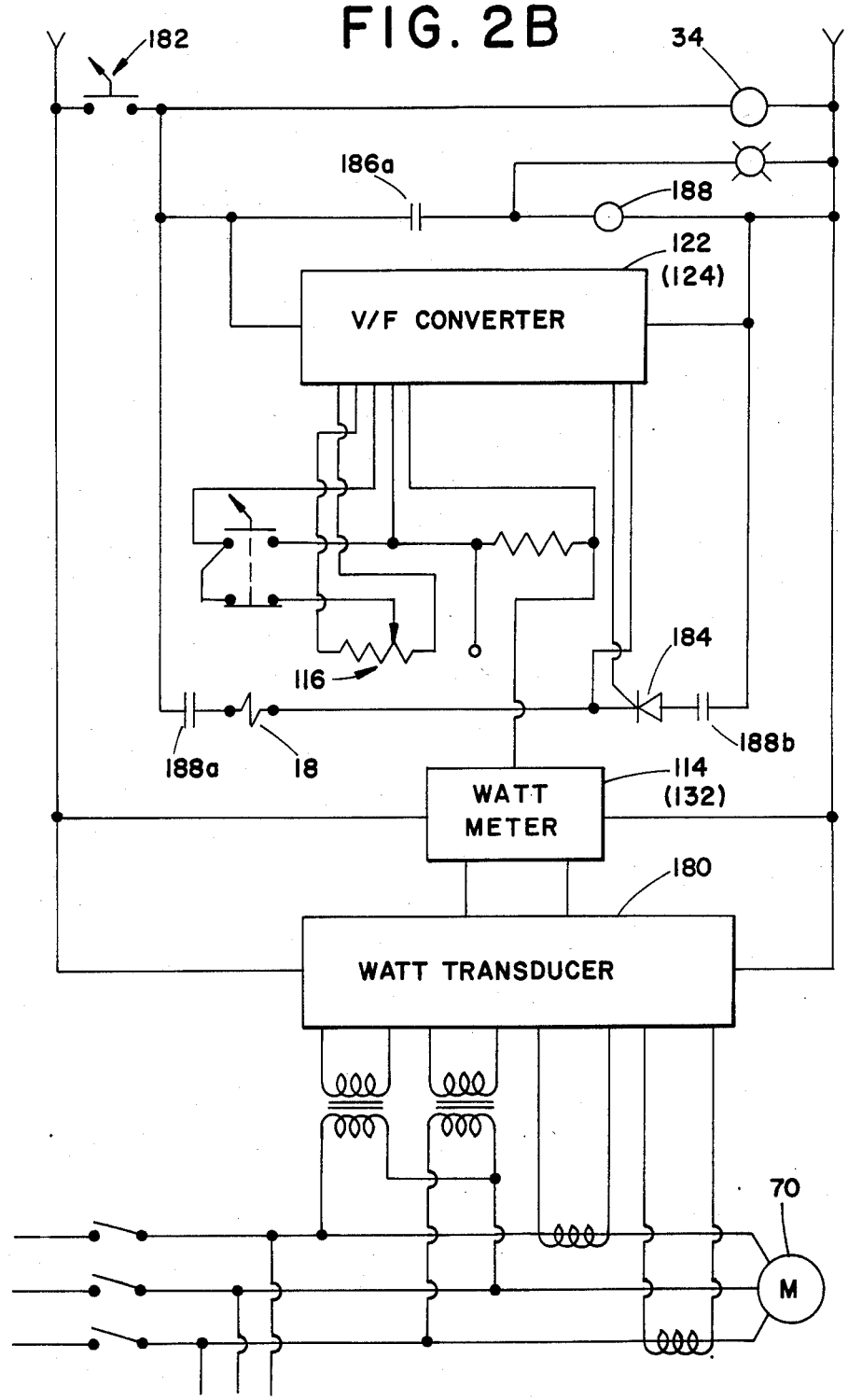

With particular reference to FIGS. 2A and B, the control circuit D includes a pair of electrical power leads 150, 152. A feed water start switch 154 is connected in series with the pressure switch 26 for sensing water feed to supply power to a feed water pump starter 156 for starting slurry pump motor 42. Once the slurry pump motor is started, a normally open relay contact 156a of the starter is closed to provide power to the slurry pump motor 42 and the flow monitor 52. A level controller 158 opens water valve 28 when the probe 32 senses that the water level in the slurry tank is below a preselected set point level.

The flow monitor 52 includes normally closed relay contacts 52a which actuate the pump priming solenoid 44. Once the pump is primed and the pressure of the fluid at the inlet of the mill has reached the appropriate level, the flow monitor 52 opens the contacts to the pump primer solenoid 44 and closes contacts 52b which supply power to a slurry feed flow control relay 160 and a slurry flow indicator 162. When preselected slurry feed rates are attained, the relay coil 160 closes a normally open contact 160a to enable power to be supplied to the normally open emergency water supply solenoid 56 for enabling termination of the emergency water supply.

Once the slurry feed is up to normal operating flow rates, the operator depresses a mill motor start button 170 which supplies power to a mill motor control relay 172. Optionally, the mill motor start push button 170 may be connected in series with a normally open contacts of the slurry feed control relay 160 for preventing the mill motor from being started until the slurry feed is up to the nominal flow rate. A mill motor starter 174 is connected in parallel with the mill motor control relay 172 for starting the mill motor. Once the mill motor is started, mill motor starter relay contacts 174a in parallel with the start button 170 are closed such that the mill motor continues to operate. The mill motor control relay 172 includes first normally open contacts 172a for controlling a mill motor indicator light 176 and second normally open contacts 172b for enabling the emergency water solenoid valve 56 to be closed.

A watt transducer 180 and the watt meter 114 monitor the power drawn by the mill motor 70. Closing a pellet feeder switch 182 supplies power to the start-up control circuit 110 including the voltage to frequency converter 122. The voltage to frequency converter gates an SCR 184 at a frequency which varies with the difference between the actual wattage drawn by the mill motor and the preselected set point wattage. When the mill motor is operating relay contacts 172c are closed. Until the power drawn by the mill motor reaches a preselected pellet feed set point, normally closed pellet set point relay contacts 114a are closed actuating a pellet feeder control relay 186. Actuating the pellet feeder control relay 186 closes normally open relay contacts 186a which enables a pellet feeder vibratory control relay 188. Enabling the vibrator motor control relay 188 closes normally open relay contacts 188a and 188b applying power across the SCR 184 and the vibratory pellet feed motor 18. As the power drawn by the mill motor increases, the vibrational frequency of the pellet feeder increases the concentration of pellets in the slurry until steady state operating conditions are attained.

Under steady state operating conditions, the vibratory feeder supplies pellets into the slurry tank 30 whenever the power drawn by the motor is below the pellet set point. When the power drawn exceeds the pellet set point, the pellet feeder is stopped reducing the pellet concentration in the slurry, hence the power drawn by the mill motor. When the power drawn again drops below the pellet set point, the pellet feeder is restarted.

When the slurry pump motor and the mill motor are started, normally open relay contacts 160b and 172c are closed. When an emergency head pressure release switch 190 is also closed, power is applied to the normally open emergency exhaust solenoid 104, closing it. When the power drawn by the mill motor 70 is below a preselected high limit or pressure set point, high limit relay contacts 114b are closed causing normally open bleed-off solenoid 100 to be closed. When the energy drawn exceeds the high limit, the high limit relay contacts 114b open allowing the bleed-off solenoid 100 to return to its open state reducing the pressure in the hydraulic reservoir. A relay 192 is also actuated when the high limit relay contacts 114b are closed. Normally open relay contacts 192a supply power to the normally closed main air pressure solenoid 96 when the energy drawn by the rotor motor is below the high limit causing the hydraulic reservoir to be pressurized.

In operation, the slurry pump 40 is actuated, then the mill motor 70. When the power drawn by the mill motor is below the pellet set point, relay contacts 114a are closed enabling the vibratory feeder 14 to feed pellets into the slurry. The hydraulic cylinders 90 are gradually pressurized until the energy drawn by the mill motor reaches the preselected pressure set point or high limit. When the energy drawn exceeds the pellet set point, the relay contacts 114a open stopping the pellet feed and reducing the pellet concentration in the slurry. When the power drawn also exceeds the pressure set point, high limit relay contacts 114b are opened causing the pressure bleed valve 100 to open and the air pressure supply valve 96 to close. When the pressure in the hydraulic cylinders has dropped sufficiently that the power drawn by the mill motor is below the preselected pressure set point, the air supply valve 96 opens and the bleed valve 100 closes allowing the hydraulic fluid pressure to increase gradually. Due to the pressure increase and decrease limiting means 98 and 102, the hydraulic fluid pressure remains generally constant at an equilibrium pressure as the bleed-off valve 100 cycles. When the power drawn drops to the power pellet set point, the pellet feeder is started. To hold the steady state operating conditions generally constant, the pellet set point and the pressure set point are closely adjacent. Preferrably, the difference between the pressure set point and the pellet set point is less than ten percent of the pressure set point, e.g. about 5%.

The invention has been described with reference to the preferred embodiment. Obviously, modifications and alterations will occur to others upon reading and understanding the preceeding detailed description of the preferred embodiment. It is intended that the invention be construed as including all such alterations and modifications in so far as they come within the scope of the amended claims or the equivalents thereof.

Having thus described the preferred embodiment of the invention, the invention is now claimed to be:

1. A method of comminuting comprising:
   rotating a rotor relative to a stator with an electric motor;
   feeding a mixture of liquid and pellets into a comminuting zone between the rotor and stator to be comminuted thereby;
   monitoring the power expended by the electric motor to cause the relative rotation between the rotor and stator;
   comparing the monitored power with a preselected set point;
   in response to the monitored power being below the set point, pressing the rotor and stator together into intimate physical contact with a selected, constant pressure; and,
   in response to the monitored power exceeding the set point, reducing the pressure with which the rotor and stator are pressed together until the monitored power drops below the set point such that the power expended by the electric motor remains substantially constant at the set point.

2. The method as set forth in claim 1 wherein the pellets are vulcanized rubber.

3. The method as set forth in claim 1 wherein the pellets are coal.

4. A comminuting apparatus comprising:
   a rotor and stator for comminuting pellets therebetween;
   a rotor means for causing relative rotational movement between the rotor and stator;
   a slurry feed means for supplying liquid and pellets to be comminuted to pass between the rotor and stator;
   a fluid actuated means for pressing the rotor and stator together;
   a hydraulic reservoir for providing hydraulic fluid to the fluid actuated means;
   a means for pneumatically pressurizing the hydraulic fluid in the hydraulic reservoir;
   a bleed valve operatively connected with the hydraulic reservoir for selectively reducing pneumatic pressure in the hydraulic reservoir;
   a power monitoring means for monitoring the power expended by the rotor motor while causing the relative rotation of the rotor and stator; and,
   a pressure adjusting means operatively connected with the power monitoring means and the bleed valve for selectively controlling the pressure maintained in the hydraulic reservoir to adjust the force with which the fluid actuated means presses the rotor and stator together such that the monitored expended power is maintained generally constant.

5. The comminuting apparatus as set forth in claim 4 further including means for limiting the rate of pressure change in the hydraulic reservoir, whereby the hydraulic fluid pressure remains generally at an equlibrium pressure determined by a duty cycle of the bleed valve.

6. The comminuting apparatus as set forth in claim 4 wherein the pressure adjusting means includes a comparing means for comparing the monitored power drawn by the rotor motor with a preselected pressure control set point power, the comparing means being operatively connected with the bleed valve to open the bleed valve in response to the monitored power exceeding the preselected pressure control set point power.

7. The comminuting apparatus as set forth in claim 6 further including slurry start-up control means for causing the slurry supply means to supply slurry with a progressively increasing pellet concentration between start-up and steady state operating conditions.

8. The comminuting apparatus as set forth in claim 7 wherein the slurry supply means includes:
   a liquid and pellet mixing region;
   a liquid feed means for supplying liquid to the mixing region; and,
   a pellet feed means for supplying pellets to the mixing region, the pellet feed means being operatively connected to the start-up control means such that a pellet supply rate is controlled thereby.

9. A comminuting apparatus comprising:
   a rotor and stator for comminuting pellets in a comminuting zone therebetween;
   a rotor motor for causing relative rotation movement between the rotor and stator;
   a slurry feed means for supplying a slurry of liquid and pellets to be comminuted to the comminuting zone to pass between the rotor and stator;
   a supplemental liquid supply for selectively supplying pellet-free liquid directly to the comminuting zone;
   a flow monitoring means for monitoring a rate of slurry flow supplied to the comminuting zone by the slurry feeding means, the flow monitoring means being operatively connected with the supplemental liquid supply for selectively supplying additional liquid flow to the rotor and stator in response to the monitored flow being below a preselected rate;
   a pressure regulator assembling for urging the rotor and stator together with a selectable force; and,
   a control system including:
      a power monitoring means for monitoring the power expended by the rotor motor while causing the relative rotation of the rotor and stator, and
      a pressure adjusting means operatively connected with the power monitoring means and the pressure regulator assembly for causing adjustment of the force with which the pressure regulator assembly urges the rotor and stator together such that the monitored expended power is maintained generally constant.

10. A comminuting apparatus comprising:
    a liquid and pellet mixing region;
    a liquid feed means for supplying liquid to the mixing region;
    a pellet feed means for supplying pellets to the mixing region at a selectable pellet supply rate;
    a mixing means for mixing the pellets and liquid in the mixing region into a slurry;
    a slurry supply means for supplying the slurry to a comminuting zone defined between a rotor and a stator;
    a rotor motor for causing relative rotational movement between the rotor and stator such that pellets of the slurry are comminuted in the comminuting zone;
    a power monitor means for monitoring the amount of power expended by the rotor motor in causing the relative rotational movement between the rotor and stator;

a comparing means for comparing the power actually expended with a preselected set point power;

a pellet supply rate means for causing the pellet feed means during start up to vary the selectable pellet supply rate to the mixing region such that the pellets are supplied to the comminuting region in proportion to a difference between the expended power and the set point power, whereby the pellet supply rate is high initially and decreases toward a steady state supply rate and whereby the slurry supply means initially supplies substantially all liquid to the comminuting zone and gradually increases the pellet concentration therein until steady state operating conditions are attained.

11. The comminuting apparatus as set forth in claim 10 wherein the pellet feed means includes a vibratory feeder and wherein the pellet supply rate means includes variable frequency means for providing a drive signal to the vibratory feeder.

12. The comminuting apparatus as set forth in claim 10 further including:
a pressure regulator assembly for urging the rotor and stator together with a selectable force; and,
a pressure adjusting means operatively connected with the power monitoring means and the pressure regulator assembly for adjusting the force with which the pressure regulator assembly urges the rotor and stator together such that the monitored, expended power is maintained generally constant.

* * * * *